United States Patent
Chang

(10) Patent No.: US 6,424,451 B1
(45) Date of Patent: Jul. 23, 2002

(54) PHASE ARRAY ACOUSTO-OPTIC TUNABLE FILTER BASED ON BIREFRINGENT DIFFRACTION

(76) Inventor: I-Cheng Chang, 879 Payne Ct., Sunnyvale, CA (US) 94087

( * ) Notice: Subject to any disclaimer, the term of this patent is extended or adjusted under 35 U.S.C. 154(b) by 0 days.

(21) Appl. No.: 09/316,898

(22) Filed: May 22, 1999

Related U.S. Application Data

(63) Continuation-in-part of application No. 08/229,546, filed on Apr. 19, 1994, now Pat. No. 5,909,304.

(51) Int. Cl.$^7$ .................................................. G02F 1/33

(52) U.S. Cl. ...................... 359/308; 359/311; 359/305; 359/298; 359/287; 359/285

(58) Field of Search ................................ 359/305, 308, 359/311, 285, 286, 287, 298

(56) References Cited

U.S. PATENT DOCUMENTS

| | | | | |
|---|---|---|---|---|
| 3,953,107 A | * | 4/1976 | Yano et al. | 359/308 |
| 4,052,121 A | * | 10/1977 | Chang | 359/314 |
| 4,204,771 A | * | 5/1980 | Shull et al. | 356/454 |
| 4,639,092 A | * | 1/1987 | Gottlieb et al. | 359/308 |
| 5,329,397 A | * | 7/1994 | Chang | 359/308 |
| 5,434,666 A | * | 7/1995 | Carnahan et al. | 356/328 |
| 5,576,880 A | * | 11/1996 | Chang | 359/305 |
| 5,909,304 A | * | 6/1999 | Chang | 359/308 |
| 6,016,216 A | * | 1/2000 | Chang | 359/285 |

* cited by examiner

*Primary Examiner*—Andrew Q. Tran

(57) ABSTRACT

An acousto-optic tunable filter (AOTF) utilizing phased array transducers for use as dynamically reconfigurable wavelength division multiplexer. The new type of AOTF has the unique capability of simultaneous and independent selection of multi-wavelength signals and separation into multiple output ports. Preferred embodiments of the AOTF are described that provide increased resolution, narrow channel spacing, lower drive power and reduced coherent crosswalk.

10 Claims, 2 Drawing Sheets

PHASE ARRAY ACOUSTO-OPTIC TUNABLE FILTER BASED ON BIREFRINGENT DIFFRACTION

This application described herein is a continuation-in-part of co-pending patent application Ser. No. 08/229,546 filed on Apr. 19, 1994, now U.S. Pat. No. 5,909,304 issued Apr. 1, 1999.

BACKGROUND OF THE INVENTION

1. Field of the invention

This invention relates to the field of electronically tunable optical filters utilizing acousto-optic (AO) diffraction.

2. Description of Prior Art

The acousto-optic tunable filter (AOTF) is an electronically tuned optical filter based on AO diffraction. The center wavelength of the passband of this type of filter is electronically tunable by changing the frequency of the acoustic wave within the interaction medium. A list of the salient features of the AOTF include wide tuning range, rapid random access tuning rate, high spectral resolution, large angular aperture, inherent modulation and multi-wavelength capability. Due to these attractive properties, the AOTF has found a variety of applications that include electronically tuned spectrometers, spectral imaging, laser wavelength tuning, and more recently, wavelength division multiplexing (WDM) cross-connect in fiber optic communication networks.

The most widely used type of AOTF utilizes a noncollinear AO interaction in a birefringent crystal wherein an incident light of a first polarization is diffracted by an acoustic wave in a birefringent crystal to a second polarization of the light beam. By properly selecting the acoustic frequencies, a number of narrow optical passbands satisfying the phase matching condition are diffracted. Over a wide spectral range, all the diffracted beams at the selected optical frequencies or wavelengths are along a single direction. The AOTF thus has a small input frequency or spectral bandwidth and a small output angular bandwidth. The filtered light beam is separable from the incident light beam spatially or by use of crossed polarizers.

One type of noncollinear AOTF was described in U.S. Pat. No. 4,052,121 entitled "Noncollinear Tunable Acousto-Optic Filter." An important feature of this type of noncollinear AOTF is its large angular aperture. This is due to the choice of an interaction geometry wherein the tangents to the loci of the incident and diffracted light wave vectors are "parallel," a condition known as non-critical phase matching (NPM). Another type of noncollinear AOTF known as the critical phase matching (CPM) type was described in U.S. Pat. No. 3,953,107; entitled "Acousto-Optic Filter." This type of noncollinear AOTF has a small angular aperture and must be restricted to a well-collimated light source. More recently, a new type of CPM AOTF was disclosed in U.S. Pat. No. 5,329,397. In this collinear beam (CB) AOTF, the acoustic group velocity is collinear with the optical beam. The CBAOTF extends the interaction length and realizes high resolution and low drive power.

The AOTFs described above are based on birefringent diffraction that couples incident light to diffracted light with orthogonal polarizations and different refractive indices. This type of AO diffraction can occur only in birefringent crystals. The AOTF is thus inherently sensitive to the polarization of the incident light since it is based on birefringent diffraction. A polarization independent (PI) AOTF using a polarization diversity configuration is disclosed in a co-pending application Serial No. 08/858,093 filed May 17, 1997, now U.S. Pat. 6,016,216, which is incorporated herein by reference. A more common type of AO diffraction is the isotropic diffraction that occurs in isotropic media or in birefringent crystals between incident and diffracted light with the same polarization. Up to now, isotropic AO diffraction has not been used for AOTF applications.

A different class of AO device is the AO Bragg cell (BC) or deflector used for laser scanning. By varying the acoustic frequency the AOBC scans an incident beam into a wide range of resolvable angular positions or spots. As a deflector a basic performance requirement of the AOBC is a large bandwidth, which is defined as the number of resolvable spots per unit time. Thus, in opposition to the AOTF, the AOBC has a large input frequency bandwidth and a large output angular bandwidth.

The realization of a large bandwidth has been one of the major goals in the design of the AO defector. One technique for increasing the bandwidth of the AOBC is the use of acoustic beam steering with a phased array of transducers. The simplest phased array employs a fixed phase difference of 180 degrees between adjacent transducer elements in a planar configuration. By selecting the inter-element spacing to be equal to the characteristic length over a larger frequency range, the bandwidth of the AOBC is thereby increased. This technique is referred to as tangential phase matching (TPM) since the steered acoustic wavevector is tangential to the locus of the diffracted light vector. A more efficient use of the acoustic power has been demonstrated using a stepped phased array where the height of each step in the phased array is equal to $\Lambda/2$. The phased array is blazed so that the beam steering angle from the transducer plane is zero at the reference acoustic wavelength $\Lambda_1$. Recently a wideband AOBC using acoustic phased array in birefringent crystals was disclosed in U.S. Pat. No. 5,576,880. All of the prior art have limited the discussion on the use of phased array for increasing the bandwidth of AO deflector by operating at the TPM condition, i.e. the steered acoustic wave is tangential to the loci of the diffracted light.

The AOBC can also be used as the dispersive element in an electronically tunable spectrometer for optical spectrum analysis. At a given frequency, the AOBC disperses an input collimated beam of wide band of optical frequencies into a distributions of resolvable angular positions or spots. By varying the acoustic frequency the center wavelength of the entire diffracted spectrum is scanned. This type of AO spectrometer was described in an article entitled, "Color Control by Ultrasonic Wave Gratings," appearing on pages 751–756 in the September 1955 issue of the Journal of the Optical Society of America. Unlike the AOTF, both isotropic and birefringent AO diffraction can be used. An AOBC based spectrometer using birefringent diffraction with a fixed acoustic frequency is described in U.S. Pat. No. 4,639,092.

For use as a wavelength selective cross-connect in WDM networks the prior art AO devices suffer from a basic limitation. The AOTF provides independent and simultaneous selection of multiple wavelengths, but it cannot separate these filtered spectral components. On the other hand, the AOBC separates all of the wavelengths into different directions but cannot independently select the wavelengths of the incident light beam. What is needed but is not yet available in the state-of-the-art is a device with the functional capability of independently and simultaneously selecting and separating multi-wavelength optical beams.

SUMMARY OF THE INVENTION

The essence of the subject invention is the discovery that by using acoustic phase array techniques, a new type of AOTF hereafter referred to as the phased array (PA) AOTF can be constructed. The PAAOTF has the narrow input optical passband feature of the AOTF as well as the wide output angular bandwidth characteristic of the AOBC. The PAAOTF provides independent and simultaneous selection and separation of multi-wavelength light beams. Functionally, it acts as a dynamically reconfigurable wavelength division multiplexer or demultiplexer.

One object of the present invention is to provide a preferred configuration of a dynamically reconfigurable wavelength division multiplexer with selectable wavelength and variable amplitude control.

Another object of the present invention is to provide preferred configurations of the PAAOTF for realizing large angular aperture, maximizing spectral resolution, lower drive power, extended optical aperture or minimize tuning speed.

DESCRIPTION OF THE PREFERRED EMBODIMENTS

Figure 1:
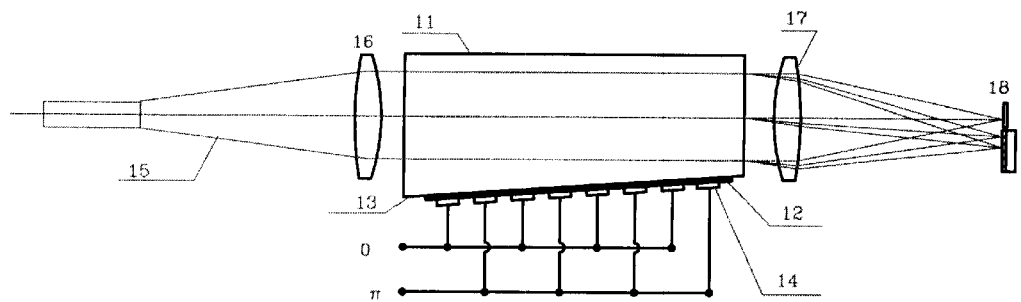
FIG. 1 is a schematic of a preferred embodiment of a PAAOTF in accordance with the present invention.

Referring to FIG. 1 therein is shown, diagrammatically, a phased array (PA) AOTF in accordance with the present invention. The PAAOTF comprises a suitable AO interaction medium 11, which may be either an isotropic or a birefringent crystal. A planar acoustic array comprising of a plurality of transducer elements 12 is mounted in intimate contact with the AO medium 11 on a common planar surface 13. The acoustic transducers are connected to a multi-frequency RF source (not shown) which generates one or more radio frequency (RF) signals the frequency and amplitude of which can be varied. At the excitation of the RF signals, the individual transducer launches an acoustic wave along the acoustic wavevector direction $\vec{k}_a$, which is normal to the transducer face 13. The applied RF signals are chosen so that the phase differences of adjacent transducer elements 14 are 180° apart. The transducer array with alternative 0° and 180° phases forms a phase grating along the array vector $\vec{k}_b$, which is normal to the acoustic wavevector $\vec{k}_a$. The magnitude of $\vec{k}_b$ is equal to $2\pi/\Lambda_b$, where $\Lambda_b$ is the array wavelength and is equal to twice the spacing between adjacent elements of the transducer array. When the acoustic waves from all transducer elements of the acoustic phase array are combined, the composite acoustic wave is then represented by a wavevector $\vec{k}_c$, which is equal to the vector sum of the single element acoustic wavevector $\vec{k}_a$ and the phased array vector, i.e., $\vec{k}_c = \vec{k}_a \pm \vec{k}_b$. As the frequency of RF signal is changed, the direction of the resultant acoustic wave is steered. The angular range of the scanning acoustic wavefront is proportional to the frequency bandwidth of the transducer, which can be increased by the use of staggered transducers with different thicknesses. An incident optical beam 15, which may be either a broadband incoherent light or a number of laser beams with different wavelengths is expanded by lens 16, enters the AO medium 11 and propagates along a predetermined axis. When the momentum matching condition is satisfied for the composite acoustic waves, part of the incident beams at the wavelengths selected by the RF signals are diffracted into separate diffracted optical beams along different directions and exits the AO interaction medium 11. The diffracted optical beams are focused by the lens 17 into a linear intensity distribution, which may be intercepted by a linear array of photodetectors 18.

Figure 2:
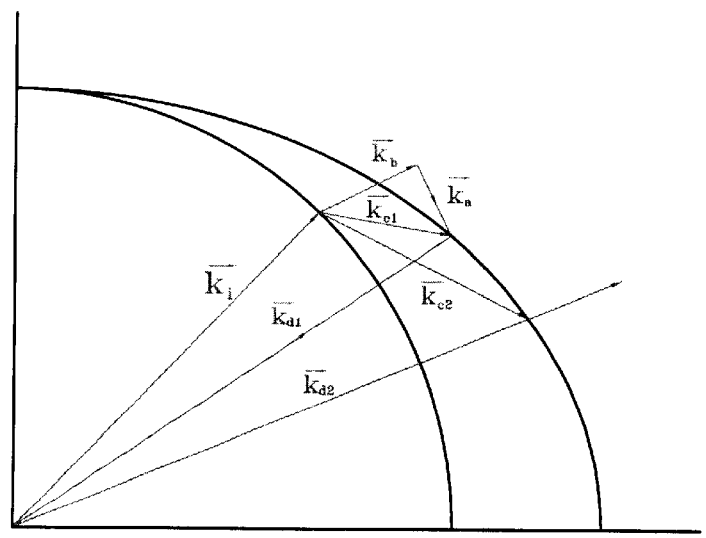
FIG. 2 shows wavevector diagrams for acousto-optic diffraction in a PAAOTF.

The following is a discussion on the characteristics of the PAAOTF in accordance with the present invention. Referring to FIG. 2 which shows the wavevector diagram of a PAAOTF using birefringent diffraction. Efficient diffraction of light within a narrow passband takes place when the momentum matching condition is satisfied, i.e., $$\vec{k}_d = \vec{k}_i + \vec{k}_c = \vec{k}_i + \vec{k}_a + \vec{k}_b \qquad (1)$$

where $\vec{k}_i$ and $\vec{k}_c$ are the wavevectors of the incident and diffracted optical waves, respectively.

The spectral filtering of the PAAOTF is the result of two distinct processes: the longitudinal spatial modulation (LSM) and the transverse spatial modulation (TSM), respectively. The spectral resolving power due to the longitudinal spatial modulation is equal to the number of composite acoustic waves across the optical path, i.e., $$R_l = \frac{L}{\Lambda_c} \cos\psi \qquad (2)$$

where L is the optical path, $\Lambda_c = 2\pi k_c$ is the wavelength of the composite acoustic wave and $\Psi$ is the angle between the acoustic and optical waves.

The transverse spatial modulation, on the other hand, causes the diffracted light to be separated from the incident light by a deflection angle, $$\Delta\theta = \theta_d - \theta_i \qquad (3)$$

where $\theta_i$ and $\theta_d$ are the polar angles for the wavevectors $\vec{k}_i$ and $\vec{k}_d$, respectively.

For AO interaction in a conventional AOTF, a collimated wide acoustic wave is used to insure efficient diffraction. However, the deflection angle $\Delta\theta$ is a constant over the entire wavelength tuning range. In a PAAOTF, on the other hand, the composite acoustic wave is steered as the RF frequency is changed. This results in a deflection of the diffracted light beam over a corresponding change of the optical wavelength $\Delta\lambda$, i.e., the use of the acoustic phased array provides scanning the optical beam across the wavelength range. This angular dispersion of the PAAOTF is illustrated by the wavevector diagram shown in FIG. 2.

The spectral resolution of the PAAOTF resulting from the transverse spatial modulation is equal to the maximum number of resolvable spots.

$$R_t = \frac{\Delta\theta_o}{\delta\theta_o} = \frac{D}{\Lambda_c}\sin\psi \qquad (4)$$

where $\delta\theta_o$ is the divergence angle of the incident light beam and D is the optical aperture. For increased resolution, a large incident beam width is needed. This is accomplished by an input beam expander such as a cylindrical lens or a prism expander.

The major difference between the PAAOTF and the conventional AOTF is the large scanned output angular characteristics over the wavelength range. The input characteristics of the AOTF are similar to those of the conventional AOTF. As such, the preferred embodiment for the conventional AOTF is applicable except with minor changes. Some of these preferred embodiments of the PAAOTF are discussed below. (a) Minimum dispersion operation: an interaction geometry wherein the single acoustic wavevector is tangential to the loci of the incident light. (b) Collinear Beam (CB) configuration: an interaction geometry wherein the optical beam is substantially collinear with the group velocity of the acoustic wave so that the optical beam is contained within the acoustic beam over the entire interaction length. The CB geometry achieves high spectral resolution and low drive power. (c) Transverse configuration: an interaction geometry wherein the group velocity of the acoustic wave is substantially perpendicular to the incident light. The transverse configuration yields the highest transverse resolution and minimum response tuning or switching.

The unique capability of simultaneous and independent selection and separation of multi-wavelength optical beams makes the PAAOTF well suited for use as a reconfigurable WDM switch in fiber optic networks. In comparison to the conventional AOTF, the most significant advantage of this type of acousto-optic wavelength division multiplexer (AOWDM) is its reduced crosstalk, particularly the coherent type since the selected multi-wavelength channels are spatially separated. The combined WDM and space division multiplexing (SDM) properties also provides the potential of scalability; the extension to large number of wavelengths and ports. In addition, the use of isotropic AOTF is very attractive since it is intrinsically polarization independent.

Figure 3:
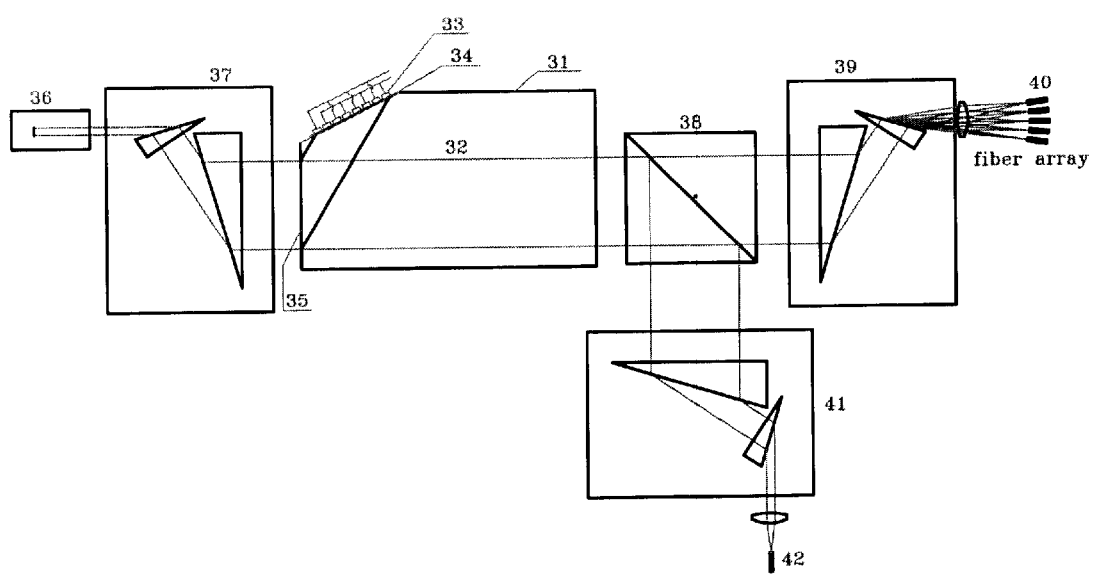
FIG. 3 is the schematic of a preferred embodiment of an acousto-optic wavelength division multiplexer (AOWDM).

FIG. 3 shows, diagrammatically, a preferred embodiment of an acousto-optic wavelength division multiplexer (AOWDM) using a collinear beam (CB) geometry. As shown in the figure, the AOWDM comprises an elongated birefringent crystal block 31 along a predetermined crystalline axis 32. A planar acoustical phased array 33 comprising of multiple transducer elements is bonded on a slanted side face 34 of the birefringent crystal block 31. The acoustical phased array generates a steered composite acoustic wave with a resultant wavevector $\vec{k}_c$, which is equal to the vector sum of single acoustic wavevector $\vec{k}_a$ and phased array grating vector $\vec{k}_b$. The resultant acoustic wave is directed to be incident on to optic face 35. The orientation of the side face 34 is properly chosen so that the resultant acoustic wave, upon reflection from the optical face 35 will be converted to an acoustic wave with a group velocity that is substantially along the long axis 32 of the elongated birefringent crystal block 31. A multi-wavelength laser beam launched from a collimator terminal of a single mode fiber 36, expanded by a stacks of prisms 37, is incident onto the birefringent crystal 31 and propagates along the predetermined axis 32. When the momentum matching condition is satisfied, part of the incident beam components with the selected wavelengths is diffracted into multiple optical beams propagating along different directions specified by the wavelengths, exits the birefringent crystal 31. A polarization beamsplitter (PBS) 38 is used to separate the diffracted beam and the incident undiffracted beam. The diffracted beam passes through a second stack of prisms 39 which reduces the beam size to that of the input beam and at the same time also multiplies the deflection angle of the diffracted optical beam. The diffracted optical beam is then coupled into an array of single mode fibers (SMF) 40. The undiffracted beam from the PBS 38 passes through another stack of prisms 41, is reduced to the original beam size and is then coupled to the single mode fiber 42.

While the descriptions above are preferred embodiments, it should be understood that many different embodiments of this invention could be made without departing from the scope thereof; it is intended that all matter contained in the above descriptions or shown in the accompanying drawings shall be interpreted as illustrative and not in a limiting sense.

I claim:

1. An acousto-optic tunable filter for dynamically multiplexing light beams at a plurality of wavelengths comprising:
   a) an input optical beam of generally randomized polarization; means for directing the input optical beam through an acousto-optic medium;
   b) transducer means for generating a single acoustic wave; an acoustical phase array means for generating a spatially modulated acoustic wave with a resultant wavevector being equal to the vector sum of the wavevector of said single acoustic wave and the array vector of said acoustical phase array;
   c) means for selecting the resultant wavevector of said spatially modulated acoustic wave to cause acousto-optic diffraction of said incident optic beam into multiple channels of output diffracted beams of selected wavelengths along separate directions; and means for changing the frequencies and amplitude of the said spatially modulated acoustic waves to change the wavelengths and amplitude of the selected output optical channels, and
   d) means for forming the input and output optical beams.

2. An acousto-optic tunable filter as in claim 1 wherein said beam forming means comprising optical means for expanding the input optical beam and reducing the output optical beam to increase spectral resolution.

3. An acousto-optic tunable filter as in claim 2 wherein said optical means is a lens assembly.

4. An acousto-optic tunable filter as in claim 2 wherein said optical means is a prism beam expander.

5. An acousto-optic tunable filter as in claim 1 further including polarizing beam splitter means to separate incident optical beam and diffracted optical beams.

6. An acousto-optic tunable filter as in claim 1 wherein said acoustical phased array comprising: a plurality of transducers mounted in intimate contact with said medium, means for applying a plurality of RF signals having the same phase difference to the adjacent transducers of said plurality of transducers, and means for selecting and varying said phase difference between adjacent transducers.

7. An acousto-optic tunable filter as in claim 6 further including means for selecting and varying said phase difference between adjacent transducers to be equal to 360/n degrees, where n is an integer.

8. An acousto-optic tunable filter as in claim 1 wherein said acoustical phased array comprising a stepped transducer array blazed at proper angle for exciting a single spatially modulated acoustic wave.

9. An acousto-optic device for diffracting light at a plurality of wavelengths comprising a birefringent crystal having an acoustical phased array means for generating a spatially modulated acoustic wave with a resultant wavevector being equal to the vector sum of the wavevector of a single acoustic wave and the array vector of said acoustical phase array, and means for selecting the resultant wavevector of said spatially modulated acoustic wave to cause birefringent acousto-optic diffraction of an incident optic beam into multiple channels of output diffracted beams of selected wavelengths.

10. A method for diffracting light at a plurality of wavelengths comprising the steps of generating a plurality of acoustic waves from an acoustical phased array in an birefringent crystal to form a spatially modulated acoustic wave, the resultant wavevector of said spatially modulated acoustic wave being equal to the vector sum of the wavevector of a single acoustic wave and the array vector of the acoustical phase array, passing an incident light through said birefringent crystal, selecting said resultant wavevector of said spatially modulated acoustic wave to cause birefringent acousto-optic diffraction of said incident light into diffracted light beams of selected wavelengths.

\* \* \* \* \*